(12) United States Patent
Lockwood et al.

(10) Patent No.: US 7,824,751 B2
(45) Date of Patent: Nov. 2, 2010

(54) STRUCTURAL REINFORCEMENT SYSTEM

(75) Inventors: James D. Lockwood, Boulder, CO (US); Lawrence D. Cercone, Frederick, CO (US)

(73) Assignee: Comptek Structural Composites of Colorado, Inc., Boulder, CO (US)

( * ) Notice: Subject to any disclaimer, the term of this patent is extended or adjusted under 35 U.S.C. 154(b) by 551 days.

(21) Appl. No.: 11/853,514

(22) Filed: Sep. 11, 2007

(65) Prior Publication Data
US 2008/0160236 A1    Jul. 3, 2008

Related U.S. Application Data

(60) Provisional application No. 60/825,241, filed on Sep. 11, 2006.

(51) Int. Cl.
*B60R 21/16* (2006.01)

(52) U.S. Cl. .................. 428/36.1; 428/36.91; 428/105; 428/193; 428/408; 52/514; 52/DIG. 7; 156/71

(58) Field of Classification Search ............... 428/36.1, 428/36.91, 105, 193, 408; 52/514, DIG. 7; 156/71
See application file for complete search history.

(56) References Cited

U.S. PATENT DOCUMENTS

| 4,068,483 A | 1/1978 | Papworth |
| 4,728,224 A | 3/1988 | Salama et al. |
| 5,330,807 A | 7/1994 | Williams |
| 5,591,265 A | 1/1997 | Tusch |
| 6,189,286 B1 | 2/2001 | Seible et al. |

*Primary Examiner*—Michael C Miggins
(74) *Attorney, Agent, or Firm*—Greenlee Sullivan P.C.

(57) ABSTRACT

A structural reinforcement system for a tubular member, comprising: a carbon fiber shell attached to the tubular member with adhesive, wherein the carbon fiber shell comprises a carbon fiber fabric sandwiched between non-carbon bidirectional fabric, wherein the carbon fiber fabric is largely unidirectional along the y-axis along the tubular member; a unidirectional or biaxial fiber reinforced polymer hoop or helical wrap connected to the carbon fiber shell, wherein the fibers of the hoop wrap are largely unidirectionally oriented in the hoop direction; and optionally a protective wrap or coating around the system is provided.

12 Claims, 8 Drawing Sheets

STRUCTURAL REINFORCEMENT SYSTEM

CROSS-REFERENCE TO RELATED APPLICATIONS

This application claims priority to U.S. provisional application Ser. No. 60/825,241, filed Sep. 11, 2006, which is incorporated by reference herein.

BACKGROUND OF THE INVENTION

Fiber reinforced polymer ("FRP") structural reinforcing systems for tubular steel members exist for the communication tower and oil & gas industries. In addition to these systems, protection systems using non-metallic components exist for the offshore riser industry. Some systems are described in U.S. Pat. Nos. 5,330,807; 4,068,483; 4,728,224; 6,189,286; 5,591,265. Systems include the following.

Communication tower legs—Round steel tower legs are currently reinforced using pre-cured carbon fiber FRP half shells. These shells are engineered so that the majority of the carbon fibers are aligned along the axial y-axis and in the same direction that loads are transferred into the steel-composite legs. These carbon reinforcements are installed to resist buckling in the tower legs between lateral supports. If an external FRP hoop wrap is applied to the exterior of the carbon shell, its purpose is to provide protection against environmental elements and not to resist internal pressure in the pipe as provided in the current invention. Installation is made by structurally adhering carbon half shells onto steel pipe legs with spacer material located between carbon shells and steel pipe to ensure the proper the bond line thickness.

Risers—Round steel riser pipes are protected using non-structural material used as protective cladding against future impact damage onto riser pipe and to slow existing corrosion. Installation is made by adhering non-structural half shells onto steel pipe legs with spacer material located between these shells and steel pipe to ensure the proper the bond line thickness. Non-structural refers to shells that are produced of materials that can resist impact loads but not capable of resisting axial y-axis loads. Another method of protecting riser pipes includes a coating such as a FPR on the outside of a structure. The coating method of protection does not add internal pressure resistance to the pipe, as provided in the current invention.

There is a need in the art for an improved structural reinforcement system.

SUMMARY OF THE INVENTION

In one embodiment, a structural reinforcement system for a tubular member, comprising: a carbon fiber shell attached to the tubular member with adhesive, wherein the carbon fiber shell comprises a carbon fiber fabric sandwiched between non-carbon bidirectional fabric, wherein the carbon fiber fabric is largely unidirectional along the y-axis along the tubular member; a unidirectional or biaxial fiber reinforced polymer hoop or helical wrap connected to the carbon fiber shell, wherein the fibers of the wrap are largely unidirectionally oriented in the hoop direction; and optionally a protective wrap or coating around the system is provided.

The carbon fiber shell can be selected from the group consisting of: pre-cured carbon shell and wet fiber carbon shell. The carbon (or glass) fiber can be in the form of uni-fabric or woven fabric, as known in the art. The fiber can also be in the form of a carbon tow, as known in the art. Specific examples of useful materials are known to one of ordinary skill in the art without undue experimentation. The biaxial fabric is a conventional woven fabric, as known in the art.

As used herein, "unidirectional" or "largely unidirectional" is intended to mean that the majority of the fibers are oriented in one direction. Unidirectional is not intended to necessarily mean that all fibers are oriented in one direction. The desired tolerance is easily determined by one of ordinary skill in the art.

BRIEF DESCRIPTION OF THE FIGURES

FIG. 4 shows various layers of the system.

DETAILED DESCRIPTION OF THE INVENTION

Figure 1:
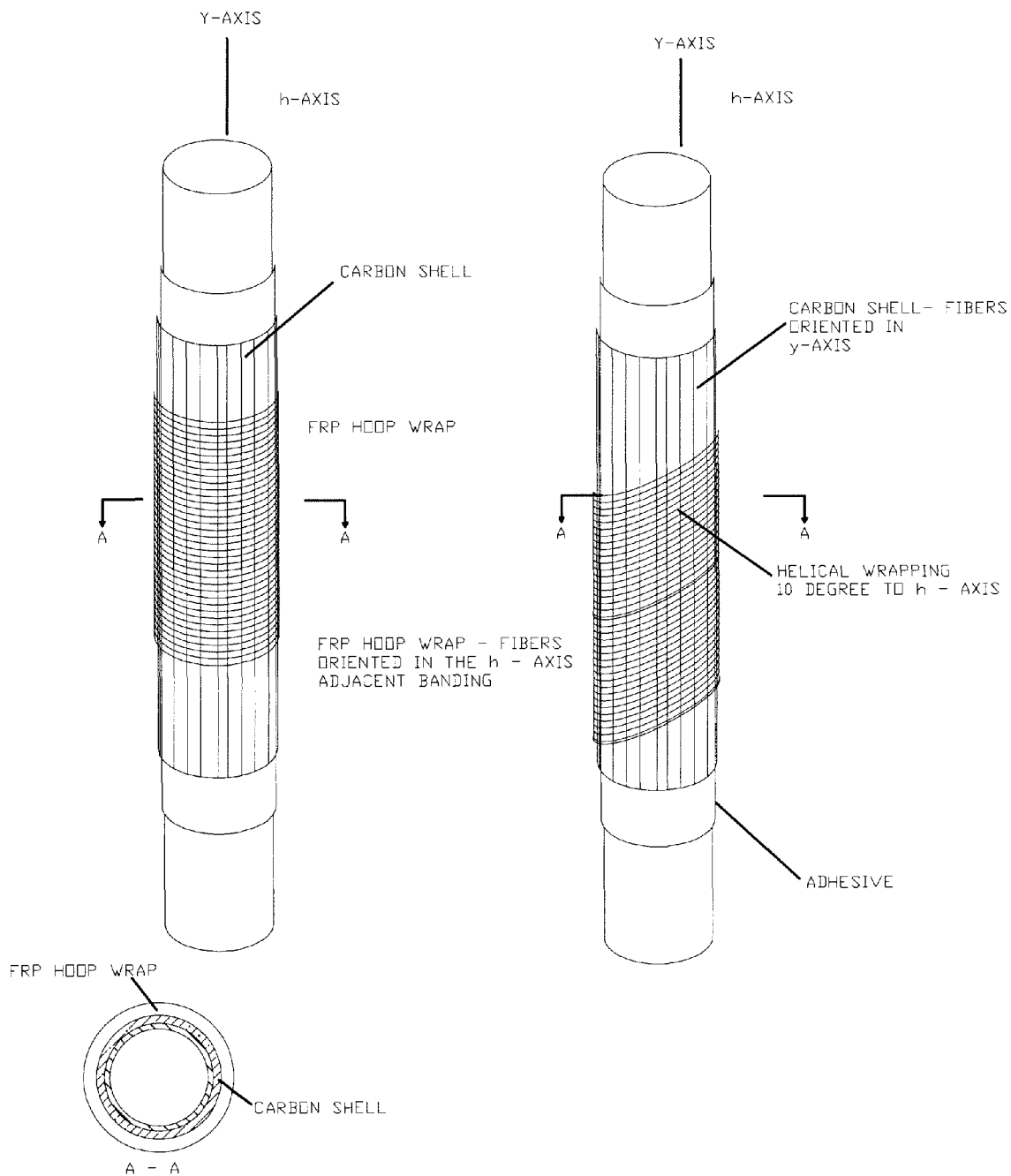
FIG. 1 illustrates two embodiments of the system, showing the carbon shell with fibers oriented along the y-axis; the FRP hoop wrap with fibers oriented in the h-axis (left hand figure) and with helical wrapping oriented 10 degrees from the h-axis (right hand figure), along with adhesive along the pipe. Also shown is a cross-sectional view showing various aspects of the system.
Figure 2:
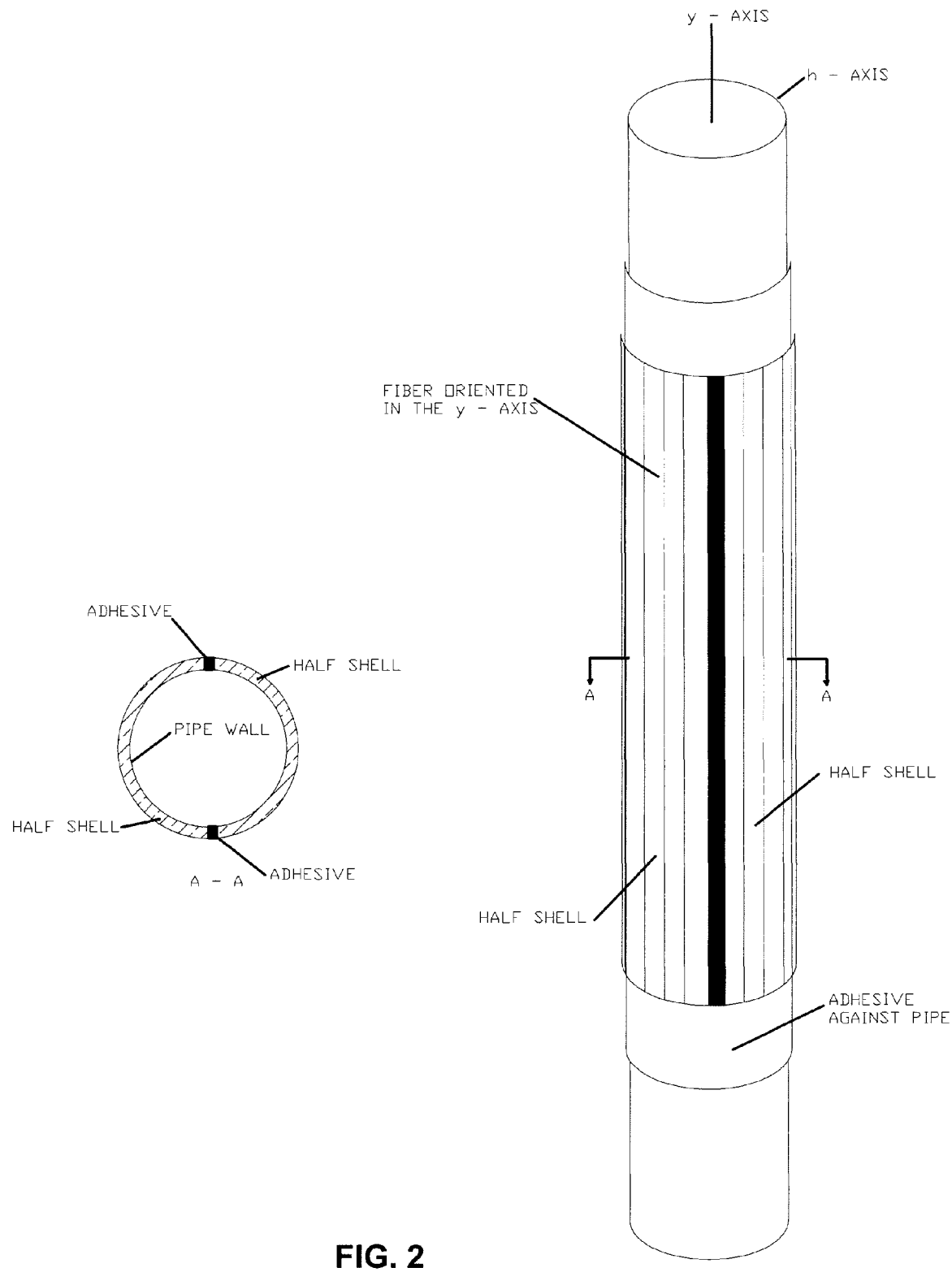
FIG. 2 shows both a cross-sectional view and side view of an embodiment of the carbon shell PC construction.
Figure 3:
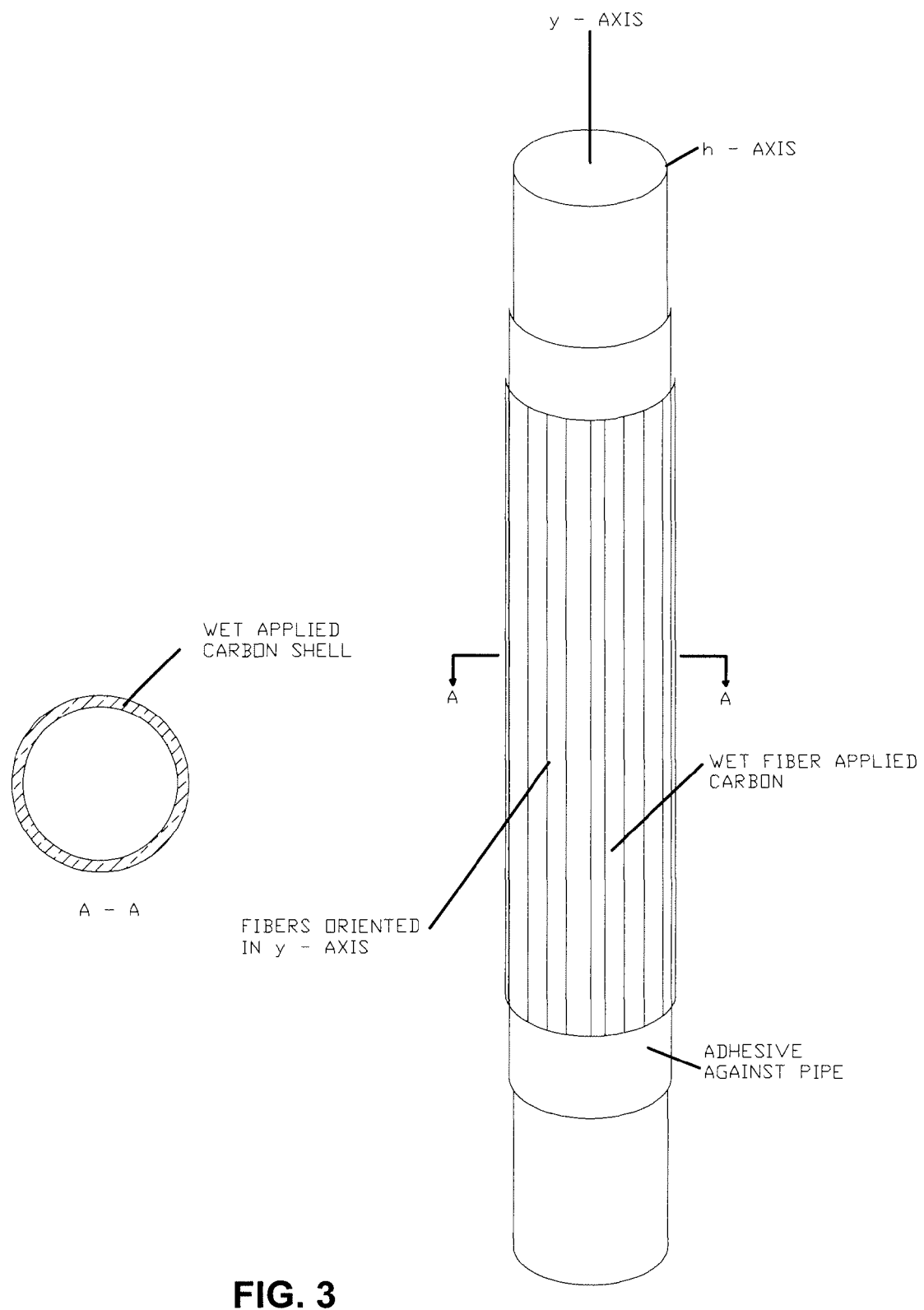
FIG. 3 shows both a cross-sectional view and side view of an embodiment of the carbon shell WC construction.
Figure 4A:
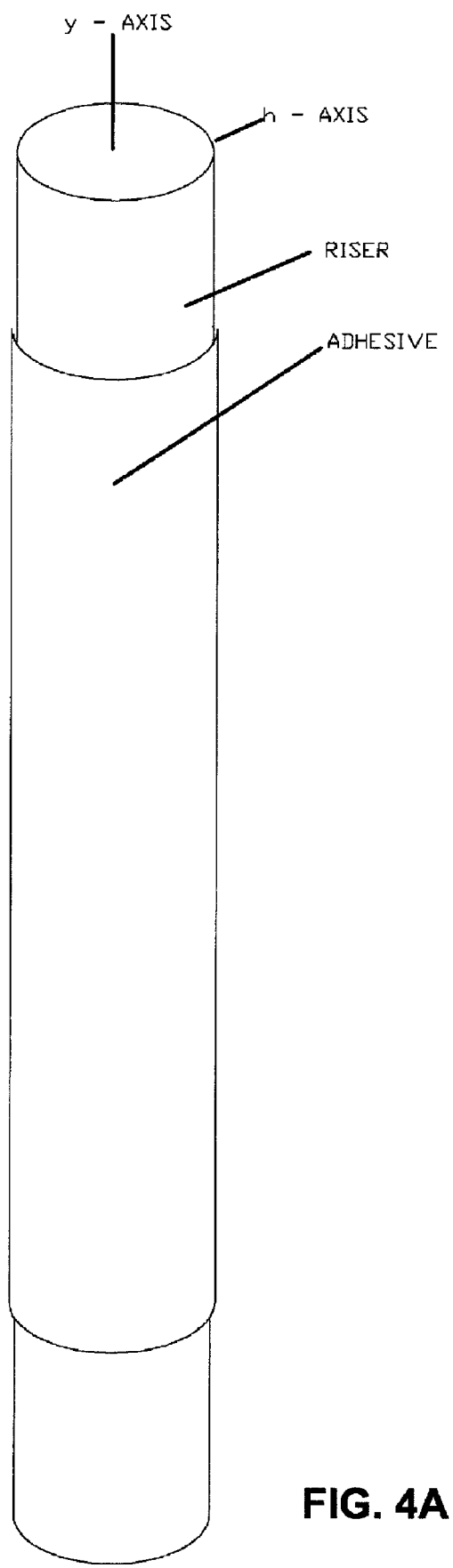
FIG. 4A shows an adhesive layer next to the riser.
Figure 4B:
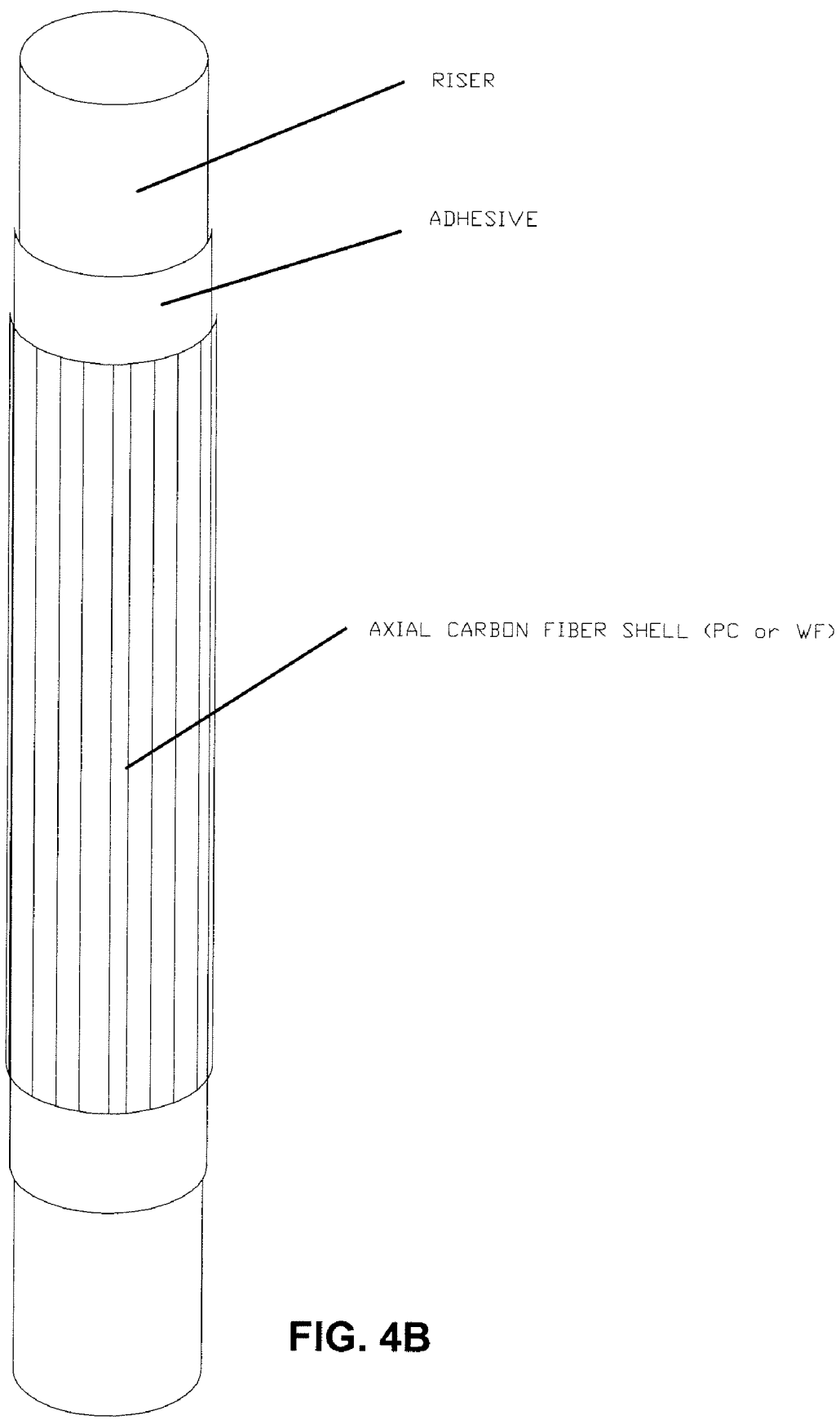
FIG. 4B adds an axial carbon fiber shell (either PC or WF).
Figure 4C:
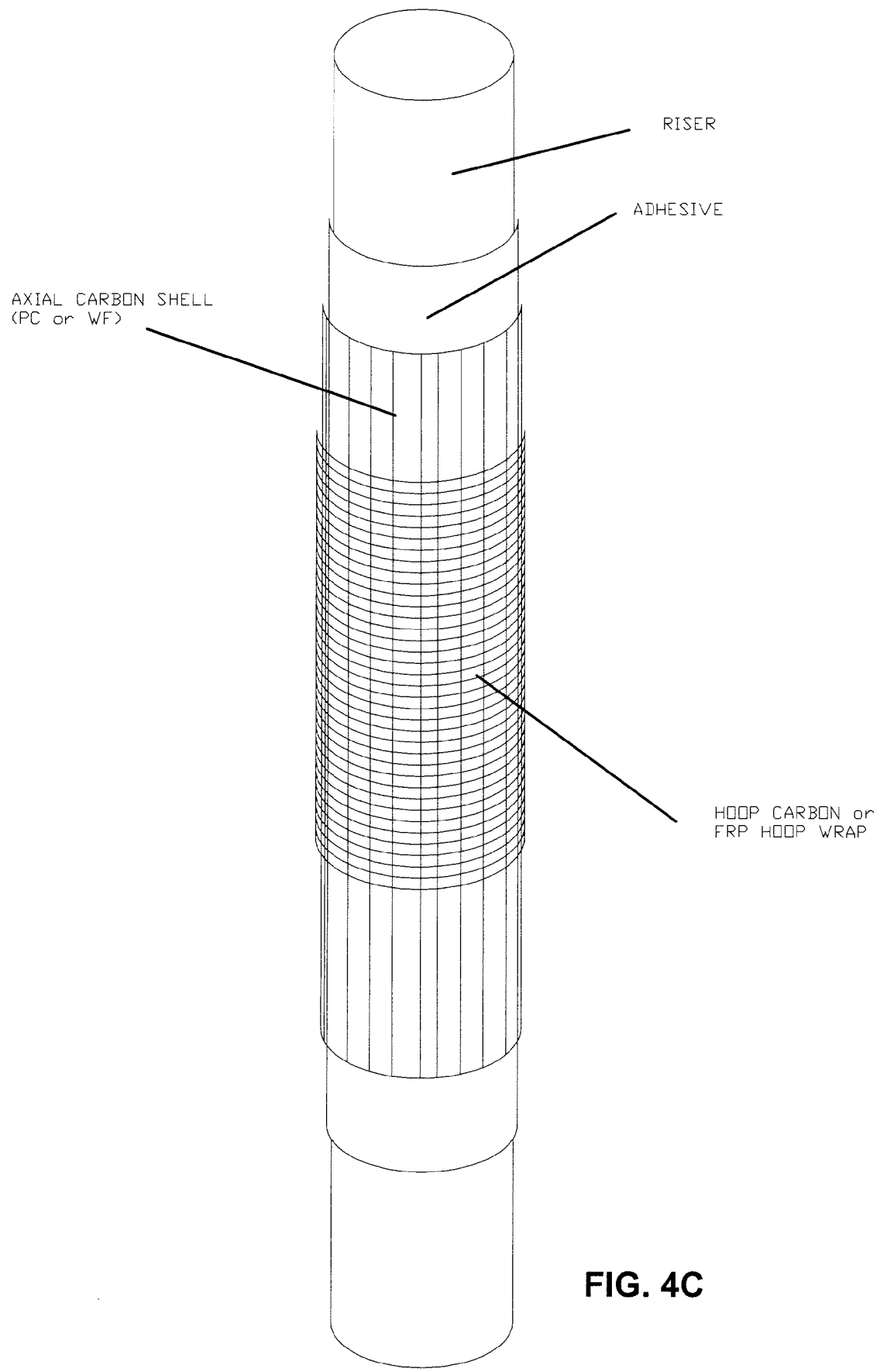
FIG. 4C adds hoop carbon or FRP hoop wrap.
Figure 4D:
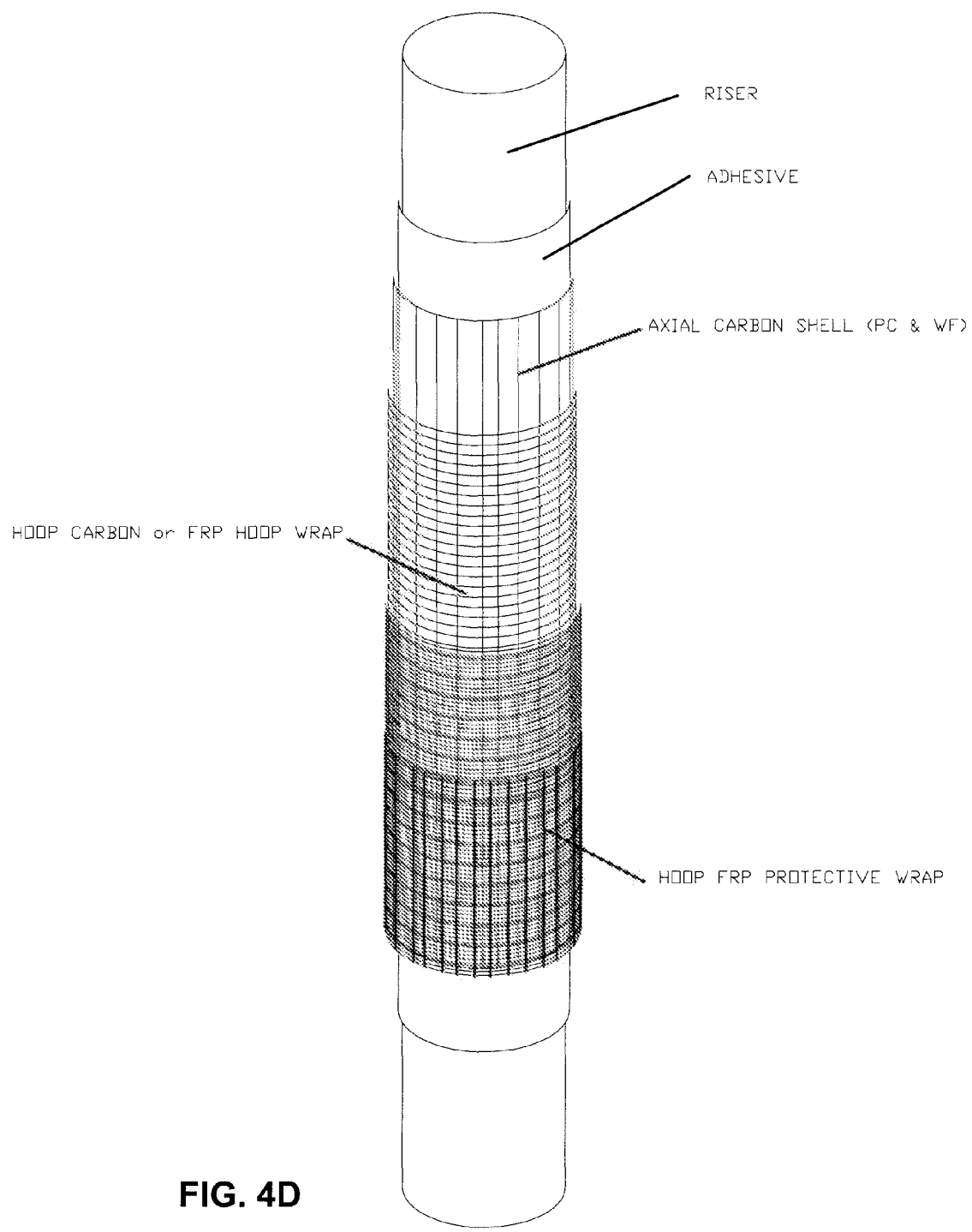
FIG. 4D adds a hoop FRP protective wrap.
Figure 4E:
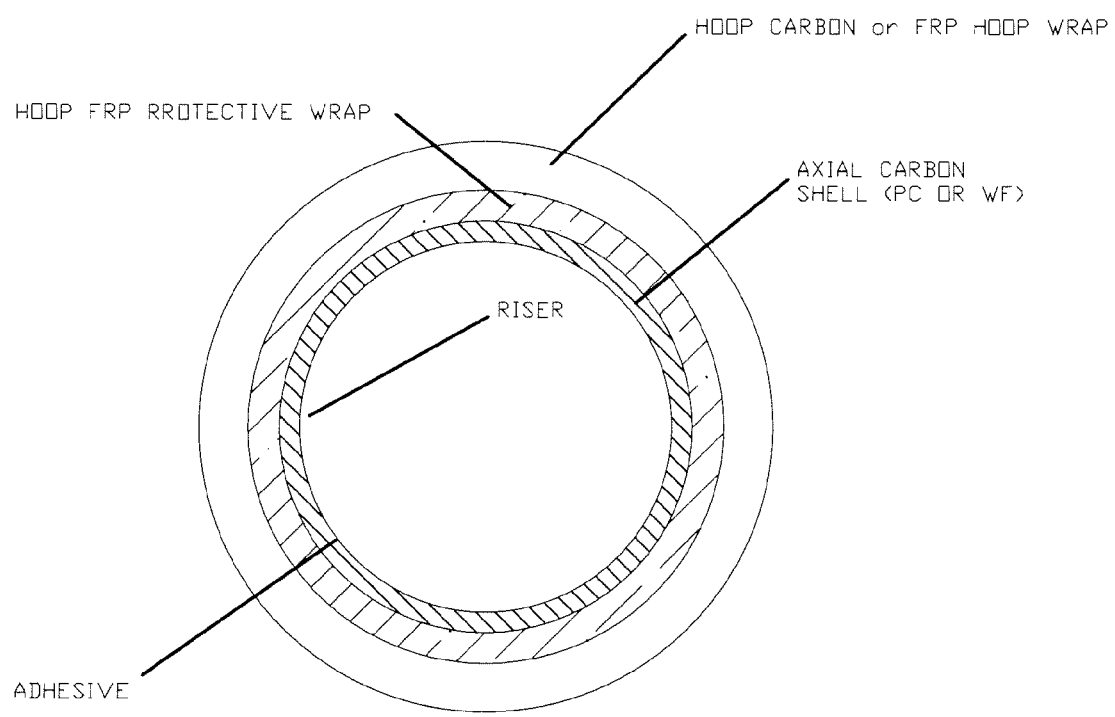
FIG. 4E shows a cross-sectional view of one embodiment of the system.

In an embodiment, the invention described provides structural reinforcing to existing riser and pipeline members. In an embodiment, provided is a riser and pipeline structural reinforcement system using a carbon fiber reinforced polymer ("CFRP") shell and CFRP or FRP hoop wrap. In an embodiment, the Structural Reinforcing System provides additional strength to the tubular member in the axial y-axis direction along the pipe's length to resist increased tensile and bending loads, and in the hoop h-axis direction to resist increased internal pressure. Although applicant does not intend to be bound by theory, the description provided is intended as non-limiting examples of some exemplary embodiments of the invention and aid in the understanding of the invention.

Structural Reinforcing System=Adhesive+Carbon shell (Pre-Cured ("PC") or Wet Fiber ("WF"))+Fiber Reinforced Polymer ("FRP") hoop wrap. The load transfer mechanism to resist tensile and bending loads between the existing tubular member and carbon shell in the y-axis direction is accomplished thru the accumulation of shear flow forces in the bond line of the adhesive.

The load transfer mechanism to resist an increase in hoop h-axis loading from internal pipe pressure is through inner laminar shear transfer between the FRP hoop wrap fabric layers installed in the hoop direction.

To provide added protection to the outside surface of the structural system against physical damage, a wet fiber FRP protective wrap or other protection known in the art can be applied.

Components of embodiments of the system are described below. Refer to the Figures provided for additional details.

Adhesive: Any suitable adhesive can be used, for example a two part toughened structural adhesive that transfers axial force between the pre-cured carbon shells and an existing pipe member. In one embodiment, the invention uses the transfer of axial forces between the carbon shell and the pipe member through shear flow. Shear flow forces accumulate through the adhesive to develop load transfer from the pipe member and the externally applied carbon shell. The adhesive layer is typically thin and typically of 1/16 to 1/8 inch when a pre-cured carbon shell is used (Carbon shell PC). When using a carbon shell PC, a spacer is placed between the pre-cured carbon shell and pipe to control the bond line thickness during installation. When the carbon shell is placed onto the pipe as wet fibers, the bond line thickness of the adhesive is typically less than 1/16 inch and spread thinly.

Pre-cured carbon shell ("carbon shell PC"): In an embodiment, a carbon shell PC is a Fiber Reinforced Polymer (FRP) structural element that is manufactured of unidirectional or largely unidirectional carbon fiber fabric sandwiched between a "non-carbon" bi-directional fabric and infused with epoxy resin prior to vacuum molding. In an embodiment, a "non-carbon" bi-directional fabric is fiberglass fabric, as known in the art. In an embodiment, the "non-carbon" bi-directional fabric creates an electrolysis barrier. The epoxy may also provide this function, but in some installations, there are pinholes in the adhesive that can interfere with the electrolysis barrier function. In an embodiment, the pre-cured carbon shell is pre-cured in the manufacturing facility prior to being installed in the field. In an embodiment, the cross section of the "carbon shell PC" has a constant radius and is manufactured in two halves and installed as a pair. The degree of radians manufactured to produce the half shell is typically slightly less than 180 degrees to allow for squeeze out of the adhesive behind the shell during its installation. In an embodiment, the carbon shell PC is installed by placing adhesive onto the inside of the carbon shell PC prior to installing onto an existing pipe section.

Alternative Wet Fiber carbon shell ("carbon shell WF"): In an embodiment, a carbon shell WF is a Fiber Reinforced Polymer (FRP) carbon fiber fabric that is impregnated with epoxy resin or urethane resin. Impregnated carbon fiber fabric is unidirectional or largely unidirectional and sandwiched between a "non-carbon" bi-directional fabric. In an embodiment, the carbon shell WF is installed wet onto the pipe and forms a "shell" when cured. Carbon shell WF is an alternative carbon reinforcement in the y-axis to the pre-cured carbon shell PC.

The purpose of the carbon shell WF is to reduce the increased y-axis axial load and resulting stresses placed onto the existing pipe wall that exist when additional external loads are applied to the new composite reinforced section. Examples of additional loadings include external laterally applied loads (wave action, debris, currents, etc) or axial loads due to gravity, buoyancy and other concentrically applied loads.

In an embodiment, installation of the carbon shell WF is accomplished through multiple passes of wet lay up layers that are placed directly onto the thinly applied adhesive layer on the pipe. The use of this application is easily carried out by one of ordinary skill in the art without undue experimentation.

In an embodiment, carbon fibers in the pre-cured (PC) or wet-fiber (WF) type carbon shell are aligned in a manner so that the majority of the fibers are placed in the y-axis direction (unidirectional). This direction provides strength and axial stiffness to the shell in the direction parallel to the walls of the steel tube. While the allowable strength of the carbon shell should be at least equal to the allowable strength of the steel, the stiffness modulus (Ecy) in the y-axis should be sufficiently high to effectively transfer load from the steel pipe wall to the carbon shell. The ratio of the stiffness modulus in the carbon (Ecy) to that of the steel (Esy) will typically vary between 0.3 to 1.0 and will determined by the carbon fiber and resin properties used to manufacture the carbon shell. This ratio is also called the modular ratio.

The non-carbon bi-directional fabric that sandwiches the largely unidirectional carbon fibers has two primary purposes. The first purpose is to provide stability and resistance of the carbon shell (PC type only) against micro cracking in the resin during handling loads (e.g., twist). The second purpose is to provide an additional physical barrier layer (additional to the adhesive layer used to transfer shear flow forces) between the carbon fibers in the carbon shell and the pipe. For a steel pipe, contact between the carbon fibers and steel pipe can result in accelerated corrosion in the steel including corrosion caused by electrolysis.

Wet fiber FRP hoop wrap ("FRP hoop wrap"): In an embodiment, a FRP hoop wrap is a FRP structural fabric that is impregnated with epoxy or urethane resin prior to installation and applied wet and uncured to the outside of the carbon shell in the field. The FRP hoop wrap may also, alternatively, be applied beneath the carbon shell in the event that the outside pipe diameter is deteriorated locally. In this embodiment, the FRP hoop wrap fills the void up to a thickness until the outside diameter of the FRP hoop wrap placed onto the pipe section is equivalent to the outside diameter of the non-deteriorated pipe. The FRP hoop wrap may also be applied beneath and over the top of the carbon shell.

In an embodiment, the FRP hoop wrap is comprised of impregnated carbon fiber fabric or impregnated non-carbon fiber fabric with the majority of the fibers oriented along the hoop direction of the fabric (unidirectional or largely unidirectional along hoop direction, h) to provide added hoop direction strength to the pipe. The FRP hoop wrap confines an increase in the internal pressure of the pipe (riser or pipeline) and transfers a percentage of these additional loads from the steel pipe wall to the FRP hoop wrap, thereby managing overstress in the steel pipe. The percentage of the load transferred to the FRP hoop wrap is a function of the modular ratio between the steel pipe hoop stiffness (Esh) and the stiffness in the hoop direction of the FRP hoop wrap (Ech).

The FRP hoop wrap can be installed in various ways, including the following:
1. Using adjacent bands wrapped at 90 degrees to the orientation of y-axis. Each band consists of multiple overlapping layers, the number of layers and corresponding length of fabric per band determined by the design requirements to resist the increase in internal pipe pressure.
2. Using continuous fabric layered onto the pipe helically and at an angle less than 90 degrees to the y-axis. This orientation is less efficient than bands to resists hoop loading. Any individual angle and range less than 90 degrees to the y-axis that provides the desired function is intended to be included herein.

Wet fiber FRP protective wrap ("FRP protective wrap"): In an embodiment, the FRP protective wrap is an FRP structural fabric that is impregnated with epoxy or urethane resin prior to installation and applied wet and uncured to the outside of the Structural System. In an embodiment, the FRP protective wrap is comprised of bi-directional non-carbon fabric used to provide impact resistance.

The FRP protective wrap can be installed in various ways, including:
1. Using adjacent bands wrapped at 90 degrees to the orientation of the y-axis. Each band consists of multiple overlapping layers, the number of layers and corresponding length of fabric per band determined by desired number of layers to resist impact loads and environmental conditions.

2. Using continuous fabric layered onto the pipe helically and at an angle less than 90 degrees to the y-axis.

A non-carbon fabric is any suitable material, including an FRP fabric woven or stitched using E-Glass, S-Glass, Basalt Fiber, or other structural fiber that is not carbon.

Additional aspects of application of an embodiment of the invention include the following. Prior to installation, the pipe section to be reinforced can be cleaned and sand blasted to a specified finish. Defects are filled with an epoxy or other type of structural filler which follows the outside radius of the pipe section.

In an embodiment of the wet wrap system, the surface of the pipe including the repaired defect areas is coated with a layer of epoxy adhesive. One or additional layers of biaxial woven cloth impregnated with epoxy or urethane is wrapped in a hoop (h-axis) direction covering the area to be repaired. Layers of impregnated carbon fiber are installed in the axial direction (y-AXIS) to a desired thickness. Layers of impregnated carbon fiber or non-carbon fiber are installed in the hoop direction (h-AXIS) to a desired thickness. One or additional layers of biaxial fabric impregnated with epoxy or urethane is wrapped in a spiral fashion covering the carbon fiber which was installed for protection of the system against environmental or physical damage.

For the shell system: The surface of the pipe including the repaired defect areas is coated with a layer of epoxy adhesive. Carbon shells, of a desired thickness, are installed in the axial direction (y-AXIS). Layers of impregnated carbon fiber or non-carbon fiber are installed in the hoop direction (h-AXIS) to a desired thickness. One layer of biaxial fabric is impregnated with epoxy or urethane and wrapped in a spiral fashion covering the carbon fiber which was installed.

It should be understood that although the present description has been disclosed by specific embodiments and optional features, modification and variation of the concepts herein disclosed may be resorted to by those skilled in the art, and that such modifications and variations are considered to be within the scope of this invention. For example, it is intended that materials other than those specifically mentioned herein, that perform the same function as those materials specifically mentioned here, may be used in an embodiment and claimed. All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

References cited herein are incorporated by reference herein in their entirety to indicate the state of the art, in some cases as of their filing date, and it is intended that this and other information in the art can be employed herein, if needed, to exclude (for example, to disclaim) specific embodiments that are in the prior art. For example, it should be understood that systems known in the prior art are not intended to be included in the claims.

When a Markush group or other grouping is used herein, all individual members of the group and all combinations and subcombinations possible of the group are intended to be individually included in the disclosure. One of ordinary skill in the art will appreciate that methods, device elements and materials other than those specifically exemplified can be employed in the practice of the invention without resort to undue experimentation. All art-known functional equivalents, of any such methods, device elements and materials are intended to be included in this invention. Whenever a range is given in the specification all intermediate ranges and sub-ranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art.

One skilled in the art readily appreciates that the present invention is well adapted to carry out the objects and obtain the ends and advantages mentioned, as well as those inherent in the present invention. The methods, components, materials and dimensions described herein are provided as examples and are not intended as limitations on the scope of the invention. Changes therein and other uses which are encompassed within the spirit of the invention will occur to those skilled in the art, are included within the scope of the claims and the scope of the invention.

Although the description herein contains certain specific information and examples, these should not be construed as limiting the scope of the invention, but as merely providing illustrations of some of the embodiments of the invention. Thus, additional embodiments are within the scope of the invention.

We claim:

1. A structural reinforcement system for a tubular member, comprising:
   a carbon fiber shell attached to the tubular member with adhesive, wherein the carbon fiber shell comprises a carbon fiber fabric sandwiched between non-carbon bidirectional fabric, wherein the carbon fiber fabric is largely unidirectional along the y-axis along the tubular member;
   a unidirectional or biaxial fiber reinforced polymer hoop or helical wrap connected to the carbon fiber shell, wherein the fibers of the wrap are largely unidirectionally oriented in the hoop direction; and optionally a protective wrap or coating around the system.

2. The system of claim 1, wherein the carbon fiber shell comprises a carbon fiber fabric sandwiched between a fiberglass fabric.

3. The system of claim 1, wherein the hoop or helical wrap comprises carbon fiber or non-carbon fiber fabric impregnated with epoxy or urethane resin.

4. The system of claim 1, wherein the tubular member is steel, aluminum or steel alloy.

5. The system of claim 1, wherein the adhesive is epoxy.

6. The system of claim 1, wherein the protective wrap is a carbon or non-carbon fiber reinforced polymer impregnated with epoxy or urethane resin.

7. The system of claim 1, wherein the first layer of biaxial fabric is applied wet or as part of the pre-cured shell, whereby the first layer is a barrier against electrolysis between the carbon and the tubular member.

8. The system of claim 1, wherein the tubular member has enhanced strength in the axial direction and enhanced hoop strength as compared to a tubular member which does not contain the system.

9. A method of reinforcing structural members comprising:
applying the structural reinforcement system of claim 1 to a structural member.

10. The system of claim 1, wherein the carbon fiber shell is selected from the group consisting of: pre-cured carbon shell and wet fiber carbon shell.

11. The system of claim 10, wherein the pre-cured carbon shell comprises two or more longitudinally split portions.

12. The system of claim 10, wherein the pre-cured carbon shell comprises two half portions.

* * * * *